M. H. MADSEN.
SIDE DELIVERY HAY RAKE AND LOADER.
APPLICATION FILED FEB. 8, 1908.
955,176.
Patented Apr. 19, 1910.
4 SHEETS—SHEET 1.
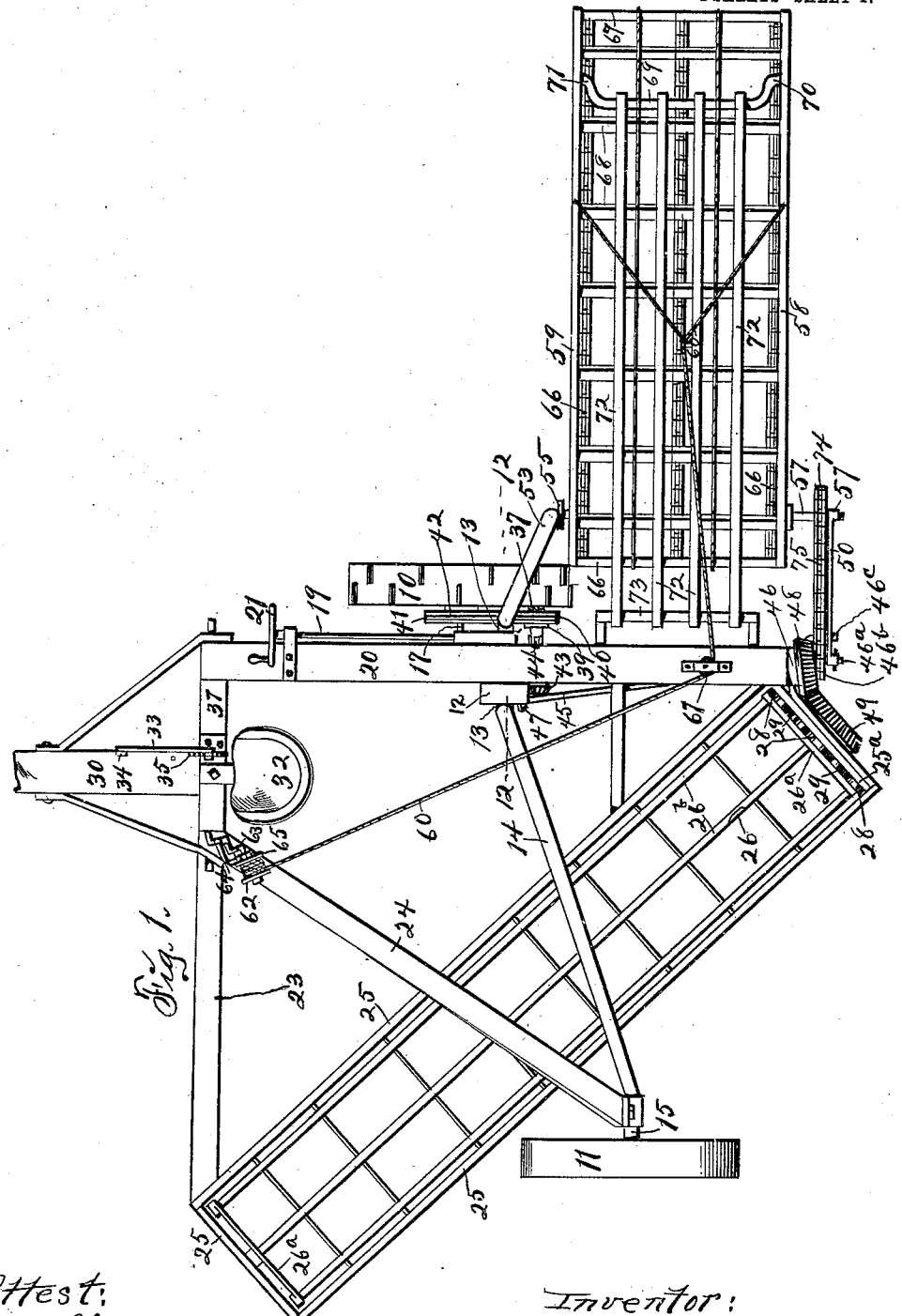

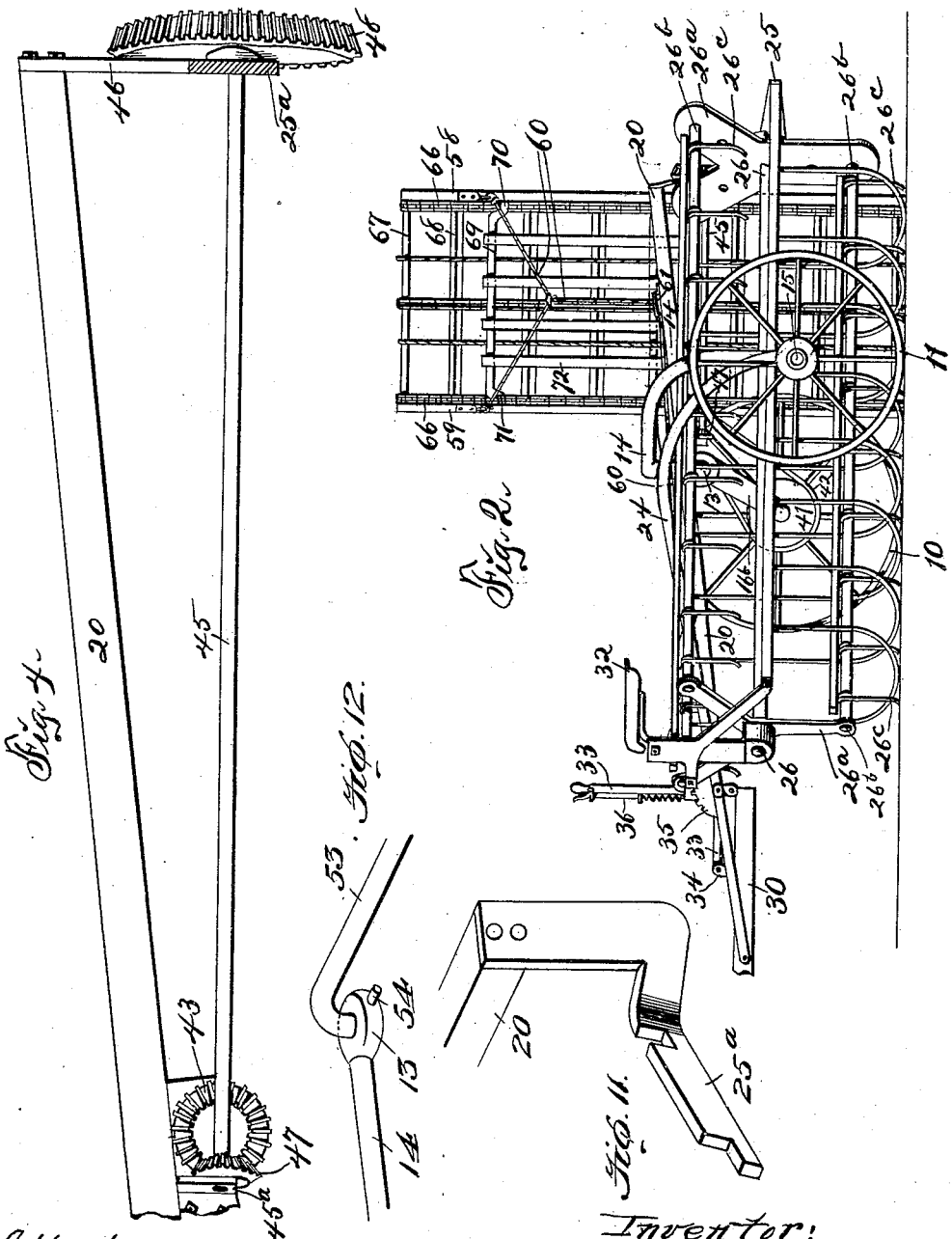

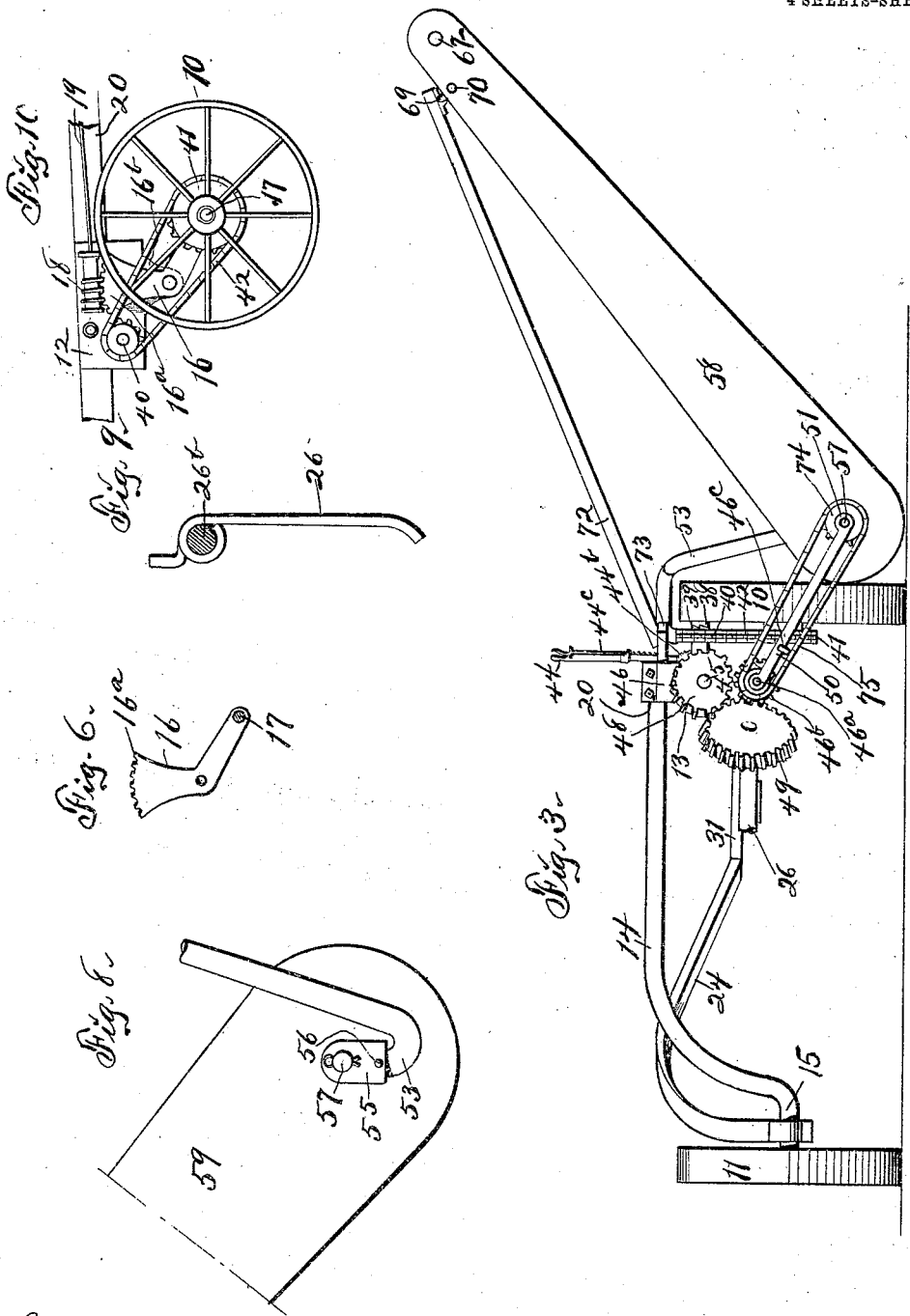

M. H. MADSEN.
SIDE DELIVERY HAY RAKE AND LOADER.
APPLICATION FILED FEB. 8, 1908.
955,176.
Patented Apr. 19, 1910.
4 SHEETS—SHEET 4.
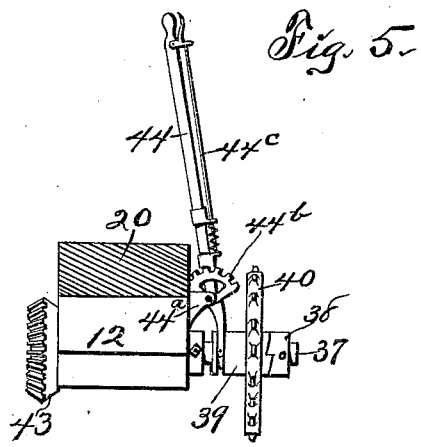
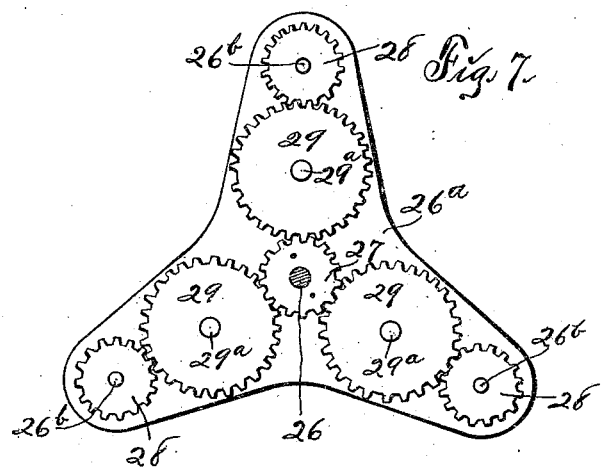

UNITED STATES PATENT OFFICE.

MADS H. MADSEN, OF KIMBALLTON, IOWA.

SIDE-DELIVERY HAY RAKE AND LOADER.

955,176.      Specification of Letters Patent.    Patented Apr. 19, 1910.

Application filed February 8, 1908. Serial No. 415,229.

*To all whom it may concern:*

Be it known that I, MADS H. MADSEN, a citizen of the United States of America, and resident of Kimballton, Audubon county, Iowa, have invented a new and useful Side-Delivery Hay Rake and Loader, of which the following is a specification.

The object of this invention is to provide improved means for loading hay on a conveyance, such as a wagon.

A further object of this invention is to provide improved means for raking and elevating hay in a field.

A further object of this invention is to provide an improved construction for a side-delivery hay rake and loader.

A further object of this invention is to provide improved means for detaching the loading mechanism from the rake frame.

A further object of this invention is to provide improved means for raising a hay rake from the ground.

My invention consists in the construction, arrangement and combination of elements hereinafter set forth, pointed out in my claims and illustrated by the accompanying drawing, in which—

Figure 1 is a plan of the complete machine in position for practical use. Fig. 2 is a left side elevation of the complete machine in position for practical use. Fig. 3 is a rear end elevation of the machine, the rake and certain other elements being removed. Fig. 4 is a detail elevation of the parts of the machine employed to transmit power from traction mechanism to rake mechanism and loading mechanism. Fig. 5 is a detail cross-section illustrating the clutch-controlled mechanism employed between the traction mechanism and the devices driven thereby. Fig. 6 is an elevation of an axle and support employed in the structure. Fig. 7 is an elevation illustrating a train of gearing employed to drive a rotary rake used in the structure. Fig. 8 is a detail elevation illustrating means employed to connect an elevator detachably to a rake frame. Fig. 9 is a detail elevation of a rake tooth employed in the structure. Fig. 10 is an elevation of part of the machine opposite to Fig. 2. Fig. 11 is a detail view showing the bearing plate and its relative parts for supporting the rear end of the raking means. Fig. 12 is a detail view showing the detachable connection between parts 14 and 53.

In the construction of the machine as shown the numerals 10, 11 designate supporting wheels, one slightly in advance of the other on a transverse line. The wheels 10, 11 are arranged to travel in parallel lines but with their axes in parallel planes transversely of the machine. The wheel 10 also has the function of a traction wheel. A casting 12 is provided and is fixed to the bottom of a beam 20 intermediate of the ends of said beam. See Figs. 10 and 6. The casting 12 is formed with a transverse aperture and a horizontal end portion 13 of an arch 14 extends through and is fixed in said aperture adjacent the beam. The arch 14 preferably is made of metal tubing, such as gas pipe, and is formed with a horizontal end portion or journal 15 on its end opposite to the end portion 13. The horizontal end portion or journal 15 of the arch 14 serves as an axle for the wheel 11. A bell-crank lever 16 is provided and is formed with a worm gear 16$^a$ on the upper end portion of its upper arm. The bell-crank lever 16 is fulcrumed on an arm 16$^b$ depending from the casting 12. A journal or stub axle 17 is formed on and extends outwardly from the lower end portion of the bell-crank lever 16 and serves as an axle for the wheel 10. The worm gear 16$^a$ is engaged by a worm 18 on a rod 19 journaled on the beam 20 and provided with a hand wheel 21 near the forward end portion of said beam. The beam 20 is arranged between and approximately parallel with the lines of travel of the wheels 10, 11.

It is the function of the worm 18, rod 19, hand wheel 21, lever 16 and their connections to raise and lower and hold the arch 14 and beam 20 relative to the horizontal plane of the axles 15, 17 of the supporting wheels. A bar 23 is fixed at one end to the beam 20 and projects laterally therefrom across the path of travel and in front of the wheel 11 and a bar 24 is attached at its rear end to the arm 15 of the arch 14, adjacent said wheel, and extends forward to the bar 23 and terminates opposite the forward end of said beam. A rake frame 25 is mounted in an oblique position between the wheels 10, 11. The forward outer end portion of the rake frame 25 is attached to the extremity of the bar 23, the central portion of said rake frame is suspended from the bar 24 and the arch 14 and the rear inner end portion of said frame is suspended by a bearing plate 25ª of any suitable construction connected to the rear end of the beam 20. A rake shaft 26 is mounted for rotation at one end in the outer end of the rake frame 25 and at its other end in the bearing plate 25ª. Spiders 26ª are mounted rigidly on the rake shaft 26 within the frame 25 and rake heads 26ᵇ are journaled in the extremities of the arms of said spiders. Rake teeth 26ᶜ are mounted on the rake heads 26ᵇ and occupy approximately vertical planes depending from said heads. A pinion 27 is mounted rigidly on the bearing plate 25ª and the rear inner end portion of the shaft 26 extends through an aperture in the center of said pinion. Pinions 28 of approximately the same diameter as the pinion 27 are mounted rigidly on end portions of the rake heads 26ᵇ. Pinions 29 of approximately double the diameter of the other pinions are mounted loosely on stub axles 29ª carried by the spider 26ª nearest to the bearing plate 25ª. The pinions 29 mesh with the pinions 27 and 28 in the manner illustrated in Fig. 7, thus forming an epicyclic gear or train which maintains the vertical positions of the rake teeth 26ᶜ in the travel of the rake heads 26ᵇ around the shaft 26, such travel being occasioned by the fixed relations of the spiders on the rake shaft and the rotation of the latter as hereinafter described. A tongue 30 is pivotally connected to a cross-head 31 mounted between and fixed to the forward ends of the beam 20 and bar 24 and a seat 32 is supported on said cross-head. Means should be provided for maintaining and effecting adjustment of the tongue relative to the beam 20 and bar 24, and to this end I have provided a lever 33 of bell crank form fulcrumed on the cross-head 31. The short arm of the lever 33 extends forward parallel with the tongue 30 and is connected at its extremity to said tongue by a link 34. The lever 33 is adapted for manual actuation and is held in any adjusted position by a segmental rack 35 on the cross-head 31 engaged by detent devices 36 of conventional form carried by said lever. Thus when the upper end portion of the lever 33 is moved rearwardly it permits the fulcrum of said lever to descend, and by this means raises the rear end of the beam 20 and lifts the rake from the ground. A short shaft 37 is journaled in and transversely of the casting 12 beneath the beam 20 and a clutch member 38 is fixed to the outer end portion of said shaft. This clutch member 38 may be simply a pin extending through the shaft and projecting at either end therefrom. A hub 39 is mounted loosely on the outer end portion of the shaft 37 and is formed with a clutch member on one end adapted to engage the clutch member 38 when said hub is rotated forwardly. A sprocket wheel 40 is fixed to the hub 39 and is connected to and driven by a sprocket wheel 41 on the wheel 10 by a sprocket chain 42. A bevel gear 43 is mounted on the inner end portion of the shaft 37. A clutch lever 44 is fulcrumed on an ear 44ª extending outwardly from the casting 12. The ear 44ª carries a segmental rack 44ᵇ adapted to be engaged by detent devices 44ᶜ of conventional form on the lever 44. The lower end portion of the lever 44 is bifurcated and embraces and engages the hub 39. Through the use of the lever 44 and its connections the hub 39 may be disengaged from the clutch member 38, thus disconnecting the sprocket wheel 40 from the shaft 37.

A shaft 45 is disposed longitudinally of the beam 20 and adjacent the inner face of said beam and is journaled at one end in an angle plate 45ª adjustably mounted on the inner face of the casting 12. The opposite end portion of the shaft 45 is journaled in a bearing arm 46 fixed to and depending from the rear end of the beam 20. A bevel gear 47 on the forward end of the shaft 45 meshes with and is driven by the bevel gear 43. A bevel gear 48 on the rear end portion of the shaft 45 meshes with and drives a gear 49 on the rear end of the rake shaft 26. The bearing arm 46 extends downward from the beam 20 and a stub axle 46ª is fixed to or formed on the lower end portion thereof and extends rearwardly therefrom. A combined gear and sprocket wheel 46ᵇ is mounted on the stub axle 46ª and the gear thereof meshes with and is driven by the gear 49 on the rake shaft 26. An arm 50 is mounted loosely on the rear end portion of the stub axle 46ª and extends laterally and downwardly therefrom. The arm 50 is removable and replaceable relative to the stub axle 46ª and has a limited movement of oscillation thereon. The arm 50 is upheld by a hook or rest 46ᶜ on the bearing arm 46, and may move upward therefrom. A bearing box 51 or journal bearing is formed on the outer end portion of the arm 50. An arm 53 is removably and replaceably mounted on the extremity of the end portion 13 of the arch 14 preferably by inserting one end of said arm in said end portion and securing the same by a removable pin 54. The arm 53 extends rearwardly and outwardly across and at the rear of the wheel 10 and a boxing or journal bearing 55 is fixed to the extremity thereof. The box or journal bearing 55 is removable and replaceable relative to the extremity of the arm 53 and normally is secured thereto by a removable pin 56. The boxes or journal bearings 51, 55 preferably are in the same horizontal plane and in alinement in the path of advance of the machine.

An elevator shaft 57 is journaled in the boxes or journal bearings 51, 55 and side boards 58, 59 are carried at their lower ends on said boxes. A cable 60 is forked at its rear end and attached to the side boards 58, 59 near the upper ends thereof, and said cable extends through a guide sheave 61 mounted on the beam 20 to and is adapted to be wound on a drum 62 preferably mounted on the bar 24 adjacent the seat 32. The drum 62 is adapted for manual actuation through the medium of a crank 63 thereon, and may be held against rotation in one direction by a pedal-operated detent 64 engaging a ratchet 65 on the drum, in order that said drum and cable may carry the weight of the elevator about to be described. It is the function of the cable 60, drum 62 and connections to adjust the inclination of the elevator. A carrier head, or carrier heads, may be mounted on the shaft 57 and an endless carrier 66 is mounted around and driven by said head or heads, and also extends around a shaft 67 in and connecting the upper ends of the side boards 58, 59. Cross-bars 68 connect the side boards 58, 59 between the shafts 57 and 67 in conventional form. A bar 69 extends across the upper portion of the elevator and is journaled by means of cranks 70, 71 on its ends in the side boards 58, 59. Pressure bars 72 are pivoted at their upper ends on the straight body portion of the bar 69 and extend longitudinally of and above the carrier to points of rest on and sliding engagement with a rod 73 on the beam 20. It is the function of the pressure bars 72 to ride on and hold the hay being elevated on the carrier and the crank formation and pivotal mounting of the bar 69 is for the purpose of permitting upward movement of said pressure bars under the influence of increased loads on the carrier, the sliding engagement of the ends of the pressure bars on the rod 73 permitting longitudinal movement of said bars and consequent rocking of the supporting bar. A sprocket wheel 74 is mounted on the rear end portion of the shaft 57 and is connected by a chain 75 to the sprocket portion of the wheel 46$^b$. Thus is a driving connection established between the shaft 45 and the elevator shaft 57 susceptible of driving the elevator and elevating hay thereon. The arm 50 may be lifted out of the hook 46$^c$ and removed with the gear 46$^b$ from the stub axle 46$^a$, and the elevator, including the side boards 58, 59, shaft 57, chain 75, and devices carried thereby be lifted away from the bearing 55. The arm 53 also may be removed from the end portion 13 of the arch 14. This done, the rake may be operated independent of and without the loader when desired.

In practical use of the machine the combined rake and loader is advanced across a field alongside of a wagon (not shown). The traction of the wheel 10 is conveyed through the sprocket gearing and bevel gearing to driving the rake and elevator in the desired directions. The side-delivery rake accumulates and bunches the hay at the foot of the elevator and said elevator conveys the hay to the wagon. The inclination of the elevator is controlled through the cable 60 and drum 62. The relation of the foot of the elevator and the base of the rake to the surface of the ground is controlled by adjustment of the rod 19 and lever 33.

I claim as my invention—

1. The combination of a side-delivery hay rake, a frame therefor, a beam connected to said frame and arranged at an angle to the rake, arms extending laterally and downwardly from said beam and removable therefrom, a shaft journaled in the lower ends of said arms, a frame journaled on said shaft, and an elevator in said frame carried by said shaft.

2. The combination of an arch, a wheel journaled on one end thereof, a casting rigidly connected to the opposite end of said arch, a bell-crank lever fulcrumed on said casting, an axle on said lever, a wheel carrying said axle, a beam carried by said casting, bars connected to said beam, a side-delivery rake carried by said bars and beam, an elevator carried by said arch and beam, and driving connections between the latter wheel and the side-delivery rake and elevator.

3. The combination of a beam, an arch fixed thereto, a wheel carrying one end of said arch, a lever fulcrumed adjacent said arch, a wheel carrying said lever, manually operated mechanism for oscillating said lever and raising and lowering said beam and arch, a side-delivery rake arranged obliquely between said wheels, arms carried by said beam and extending laterally and downwardly therefrom to one side of the path of travel of the rake, an elevator removably and replaceably mounted on said arms, and driving mechanism connections between the latter wheel and said rake and elevator.

4. The combination of a beam, an arch fixed thereto, a wheel carrying one end of said arch, a bell-crank lever fulcrumed adjacent said arch, a wheel carrying said lever, manually operated mechanism for oscillating said lever and raising and lowering said beam and arch, a side-delivery rake arranged obliquely between said wheels, an elevator carried by said frame and driving mechanism connections between the latter wheel and said rake and elevator.

5. The combination of a casting, a beam thereon, an arch fixed to said casting, a frame carried by said arch and beam, a wheel carrying one end of said arch, a bell-crank lever mounted on said casting and arranged for manual adjustment and oscillation, an axle on said lever, a wheel carrying said axle, a side-delivery rake carried by said frame and beam, an elevator carried by said arch and beam, and driving connections between the latter wheel and the rake and elevator.

6. The combination of a beam, an arch fixed thereto, a wheel carrying one end of said arch, a lever fulcrumed adjacent said arch, a wheel carrying said lever, manually operated mechanism for oscillating said lever and raising and lowering said beam and arch, a side-delivery rake arranged obliquely between said wheels, arms carried by said beam and extending laterally and downwardly therefrom to one side of the path of travel of the rake, an elevator removably and replaceably mounted on said arms, rope and windlass devices for oscillating the elevator, and driving mechanism connections between the latter wheel and said rake and elevator.

7. The combination of a beam, an arch fixed thereto, a wheel carrying one end of said arch, a lever fulcrumed adjacent said arch, a wheel carrying said lever, manually operated mechanism for oscillating said lever and raising and lowering said beam and arch, a side-delivery rake arranged obliquely between said wheels, arms carried by said beam and extending laterally and downwardly therefrom to one side of the path of travel of the rake, an elevator removably and replaceably mounted for oscillation on said arms, a cable attached to said elevator at one end, a drum attached to the opposite end of the cable, and driving mechanism connections between the latter wheel and said rake and elevator.

Signed by me at Kimballton, this twenty seventh (27) day of January, 1908.

MADS H. MADSEN.

Witnesses:
J. M. GREGERUN,
H. C. MADSEN.